United States Patent [19]

Dunkley

[11] 3,985,953

[45] Oct. 12, 1976

[54] GRAVURE PRINTING METHODS AND APPARATUS WITH ROTARY SHUTTER

[75] Inventor: Rowland A. G. Dunkley, Chorley Wood, England

[73] Assignee: Crosfield Electronics Limited, London, England

[22] Filed: Mar. 18, 1975

[21] Appl. No.: 559,407

[30] Foreign Application Priority Data

Mar. 20, 1974 United Kingdom............... 12366/74

[52] U.S. Cl. .......................... 178/6.6 B; 178/6.6 R; 346/76 L; 101/467

[51] Int. Cl.².......................................... G11B 11/00

[58] Field of Search ........... 178/6.6 B, 6.6 R, 6.7 R, 178/6.6 DD; 346/76 L; 101/467

[56] References Cited

UNITED STATES PATENTS

| | | | |
|---|---|---|---|
| 2,818,465 | 12/1957 | Brink | 178/6.7 R |
| 3,006,238 | 10/1961 | Eberline | 178/6.7 R |
| 3,455,239 | 7/1969 | Smith | 178/6.6 B |
| 3,636,251 | 1/1972 | Daly | 178/6.6 R |
| 3,742,129 | 6/1973 | Roberts | 178/6.6 B |

*Primary Examiner*—Daryl W. Cook
*Assistant Examiner*—Alan Faber
*Attorney, Agent, or Firm*—Kemon, Palmer & Estabrook

[57] ABSTRACT

In a method of preparing a gravure printing member by excavating materials from the surface by a scanning laser beam or other energy beam, the path of the beam to the surface is periodically intercepted during the scanning by a rotary shutter, the position and speed of the rotary shutter and the relative movement of the scanning system and the surface of the printing member being such that the shutter shadow is substantially stationary relative to the surface of the printing member during its passage across the beam, the protected portions of the surface constituting the walls of the gravure cells.

11 Claims, 3 Drawing Figures

GRAVURE PRINTING METHODS AND APPARATUS WITH ROTARY SHUTTER

In gravure printing, ink is applied to a printing surface which is formed with depressions to retain the ink. Surplus ink is removed from the areas of the printing surface between the depressions and the printing member is then brought into contact with a sheet to be printed, the ink then transferring from the depressions to the sheet. The printing surface is usually of copper or chromed copper and the depressions are generally approximately square and are laid down in a regular geometric pattern. The cells are etched to variable depth to produce the tonal differences in the completed print. The cell walls, i.e., the areas of the printing surface between the cells, support a doctor blade which wipes off surplus ink.

For colour reproduction, the geometry of the cell pattern is different for different colour separations, to reduce patterning or Moire effects.

The conventional gravure process requires the etching of a cylinder, after exposure to form the recesses in the printing surface.

According to the present invention, the surface of a printing member to be prepared and an energy beam directed at the surface undergo relative movement such that an image-forming area of the surface is scanned, element by element, by the energy beam, the beam having a power sufficient to decompose or evaporate material from the surface, and the path of the energy beam to the printing surface is periodically intercepted during the scanning by a rotary shutter positioned either substantially in the plane of the surface or in a plane conjugate with the surface plane with respect to a lens focusing the beam, the shutter having a speed of rotation such that the shutter in the surface plane or the shutter image in the surface plane, respectively, is substantially stationary relative to the surface during passage across the beam, the portions of the surface which are projected from the action of the beam by the shutter providing walls for the cells which are formed by the decomposition or evaporation of material from the surface and which will retain ink during printing. The cell walls provide a contact surface for the doctor blade during printing. Preferably, the energy beam is a laser beam and the printing surface is of a plastics material.

In the preferred method embodying the invention, the rotary shutter is a disc having a ring of apertures, so positioned that by rotation of the disc the apertures of the ring pass in succession through the laser beam. The apertures may be of generally square configuration and a number of concentric rings of apertures may be provided, the square apertures of the different rings having different inclinations so as to be suitable for providing different screen angles for the apertures in the printing surface.

In order that the invention may be better understood, one example of a method embodying the invention and apparatus for carrying the method into effect will now be described with reference to the accompanying drawings, in which.

Figure 1:
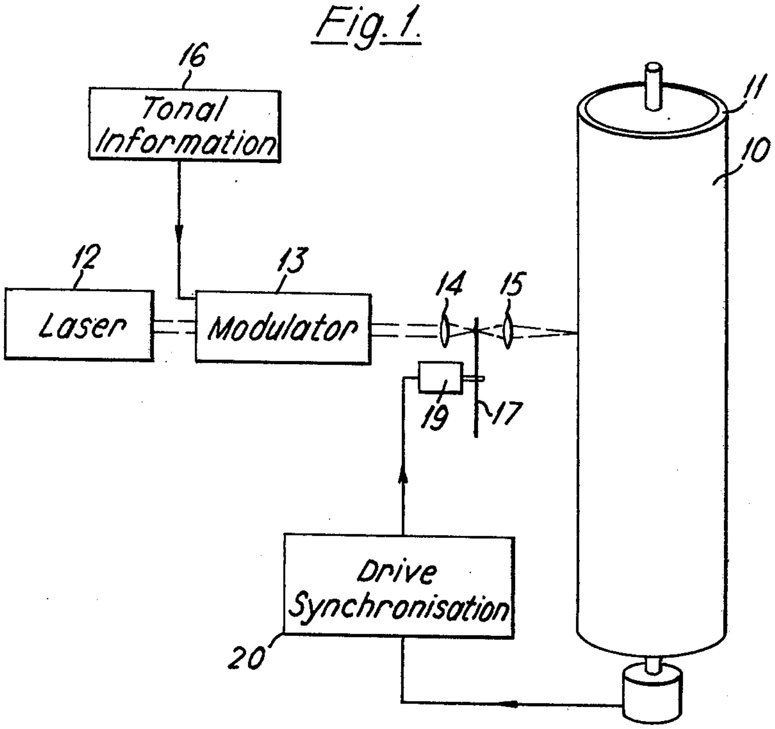
FIG. 1 shows diagrammatically a first form of apparatus for carrying out a method embodying the invention.

In FIG. 1, a cylinder 10 has a plastics surface layer 11 which may be of an epoxy resin, for example. A laser 12 directs its beam through a modulator 13 and focusing lenses 14 and 15 on to the plastics coating of the cylinder. The cylinder is given a rotation about its axis to cause the beam to scan a circumferential track on the cylinder and at the same time the laser beam which falls on the surface is caused to move in a direction parallel to the cylinder axis by means not shown in the drawing. Typically this is achieved by mounting the laser or a deflector in the beam path on a lead screw driven in synchronism with the rotation of the cylinder but at a much slower speed. The modulator 13 is controlled by a signal varying in accordance with tonal information relating to the image to be reproduced, the source of this tonal information being represented by the block 16 in the drawing. Typically, the block 16 may include a cylinder similar to the cylinder 10 (or an extension of the cylinder 10) on which the image to be reproduced is mounted, the image on the cylinder being scanned by an analysing head, the scanning movement being brought about by rotation of the cylinder about its axis and movement of the analysing head along a lead screw. The analysing head contains photoelectric means for deriving a signal having an amplitude dependent upon the density of the element which is being scanned. An example of apparatus having such an analysing head is shown in U.S. Pat. No. 3,894,178.

Figure 2:
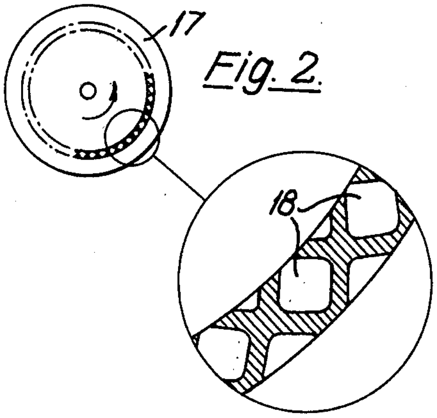
FIG. 2 shows a chopper disc used in the apparatus of FIG. 1.

The laser beam is periodically interrupted by a chopper disc 17, shown in front elevation in FIG. 2. It will be seen from FIG. 2 that the disc 17 has apertures 18 having the shape of gravure screen cells and at the required angle to the disc radius. The apertured circular track is like a strip of gravure-screen pattern bent round into a circle. The principles involved in designing an angled pattern are set forth in U.S. Pat. No. Re. 28,255. The apertures permit the passage of the modulated laser light to the plastics coating of the cylinder in a periodic manner. The disc 17 is driven by a motor 19, synchronised with the rotation of the cylinder by a synchronising unit 20. The chopper is placed at the conjugate focus of the lens 15, so that an image of an aperture 18 in the beam path is formed at the cylinder surface. The instantaneous velocity of the part of the rotary disc illuminated by the laser is such that the resulting moving image at the rotating cylinder surface is stationary with respect to the cylinder surface. The rotary disc thus has the effect of a stencil on the laser engraving which, apart from a scale change, is the same as would be produced if the disc were in direct contact with the cylinder.

With this arrangement, the cell pattern is determined by the aperture pattern in the disc 17 and the cell depth information is established by amplitude modulation of the laser beam.

A neodymium-YAG laser can be used in the arrangement of FIG. 1. Alternatively a carbon dioxide laser may be used but its longer wavelength may result in a poorer resolution of the screen pattern.

A single rotary disc may have several rings of apertures around it at different radii corresponding to different screen angles, for example for colour reproduction; in this case provision is made for varying the speed of rotation of the disc relative to the cylinder when a change from one ring to another is made.

Figure 3:
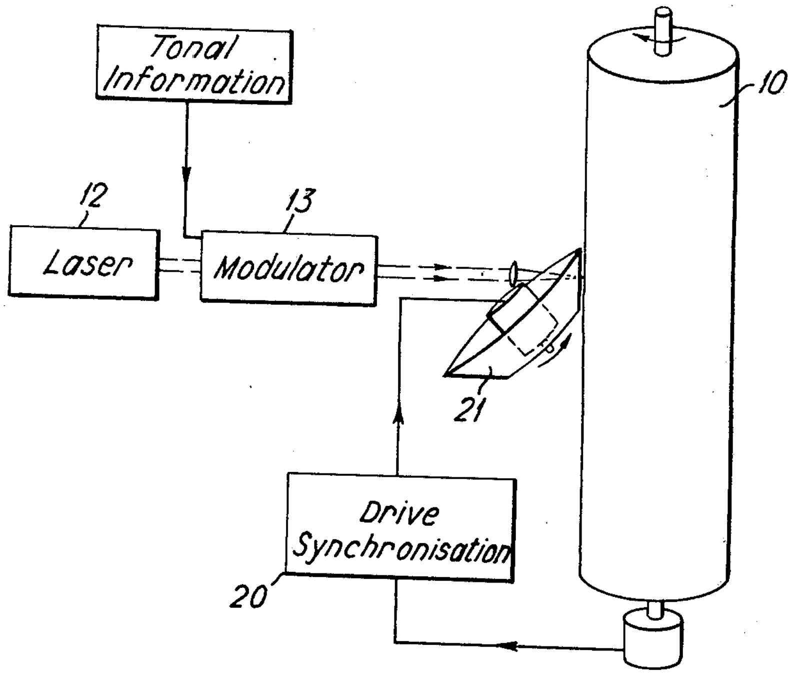
FIG. 3 illustrates an alternative form of apparatus employing a conical rotary shutter.

In the arrangement shown in FIG. 3, the chopper disc 17 is replaced by a truncated cone 21 or a part of a sphere which is placed so that the portion of the cone or sphere in the laser beam is substantially in the plane of the cylinder surface. In theory, a disc of the kind shown in FIG. 2 could be used in the plane of the cylinder surface but this leads to mechanical difficulties; additionally, the truncated cone or part-sphere has the property of added stiffness. As before, they may carry angled tracks at various radii for different screen angles.

The plastics surface may be plated with chrome prior to printing. The printing member may be a flat plate or a cylinder.

Furthermore, although the above-described apparatus employs a laser beam, the invention may also be applied to apparatus utilising an electron beam for excavating a metal surface, the rotary interceptor and workpiece being then preferably in planes which are conjugate with respect to the electron lens system.

I claim:

1. A method of preparing a printing member in which an energy beam is directed at the surface of the printing member, and in which the surface and energy beam undergo relative movement such that an image-forming area of the surface is scanned, element by element, by the beam, the beam having a power sufficient to decompose or evaporate material from the surface, the method comprising periodically intercepting the path of the beam to the printing surface during the scanning by a rotary shutter positioned either substantially in the plane of the surface or in a plane conjugate with the surface plane with respect to a lens focusing the beam, the shutter having a speed of rotation such that the shutter in the surface plane or the shutter image in the surface plane, respectively, is substantially stationary relative to the surface during passage across the beam, the portions of the surface which are protected from the action of the beam by the shutter providing walls for the cells which are formed by the decomposition or evaporation of material from the surface and which will retain ink during printing.

2. A method in accordance with claim 1, in which the energy beam is a laser beam.

3. A method in accordance with claim 2, in which the printing member is a cylinder and in which one component of the said relative movement is achieved by rotation of the cylinder.

4. Apparatus for preparing a printing member, comprising:

a laser;

means for supporting a printing member for rotation about a fixed axis;

a lens system between said laser and said printing member for focusing the radiation from said laser onto the surface of said printing member;

first driving means for achieving a relative scanning movement between the beam from said laser and the surface of said printing member;

a rotary interceptor positioned between said laser and said printing member and having apertures permitting the passage of the laser beam therethrough;

second driving means for rotating said interceptor whereby the passage of the beam from said laser is permitted by the apertures at intervals during the rotation of said interceptor, said second driving means being synchronised with said first driving means and said interceptor being either substantially in the plane containing the portion of the surface of said printing member on which the beam is incident or in a plane conjugate with the said surface plane, with respect to said lens system, and being further positioned so that the shadow cast by the interceptor portion which is passing through the beam is stationary relative to the surface portion of said printing member on which the shadow falls, whereby those portions of the printing member surface which are protected from exposure to the laser beam during scanning become walls for the cells excavated in the surface of the printing member by contact with the laser beam.

5. Apparatus in accordance with claim 4, in which the rotary interceptor is a disc having a ring of apertures positioned so that by rotation of the disc the apertures of the ring pass in succession through the laser beam.

6. Apparatus in accordance with claim 5, in which the apertures of the disc are of generally square configuration.

7. Apparatus in accordance with claim 6, in which the disc is provided with a number of concentric rings of apertures of substantially square configuration, the apertures of different rings having different inclinations so as to be suitable for different screen angles at the printing surface.

8. Apparatus in accordance with claim 4, in which the rotary interceptor is a hollow rotary cone in which a ring of apertures is formed co-axially, the cone being mounted so that a line on the conical surface lying in a plane containing the axis of the cone, is parallel to and close to the surface of the printing member.

9. Apparatus in accordance with claim 4, in which the rotary interceptor is a part-spherical rotary member in which a ring of apertures is formed co-axially with the axis of rotation of the part-spherical member, the part-spherical member being mounted so that where it passes through the laser beam it is substantially in the plane of the printing surface.

10. Apparatus in accordance with claim 4, in which the portion of the rotary interceptor in the path of the laser beam and the surface of the printing member are in conjugate planes with respect to a focusing lens in the path of the laser beam.

11. Apparatus in accordance with claim 4, in which the rotary interceptor is so arranged that the portion thereof illuminated by the laser beam at any instant is substantially at the plane of the surface of the printing member.

* * * * *